Feb. 28, 1939.  W. C. EDWARDS  2,148,609
STEERING COLUMN LOCK
Filed May 31, 1935  2 Sheets-Sheet 1
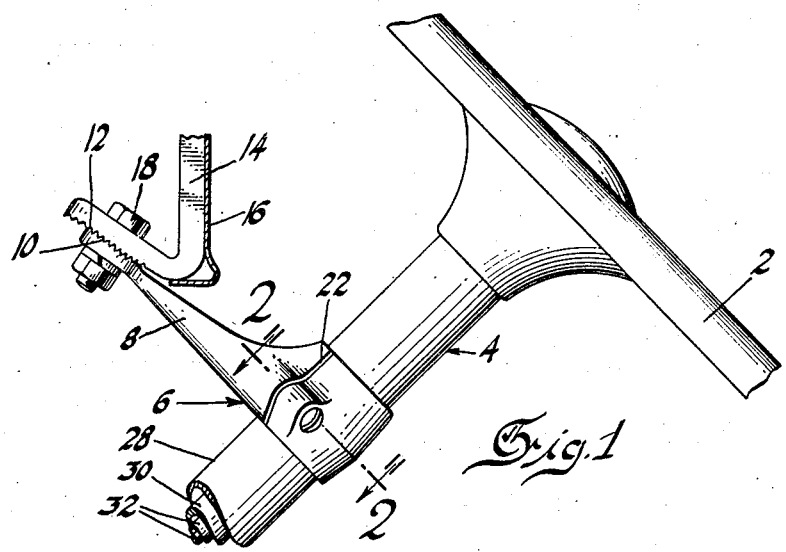
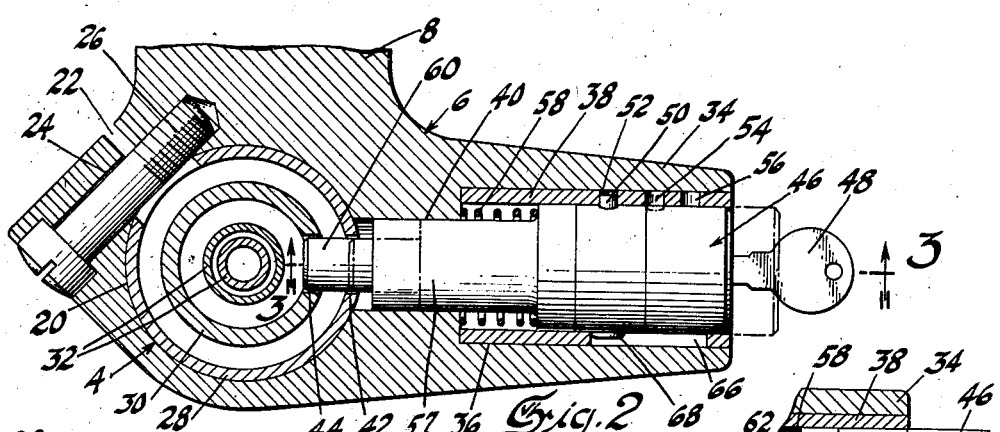
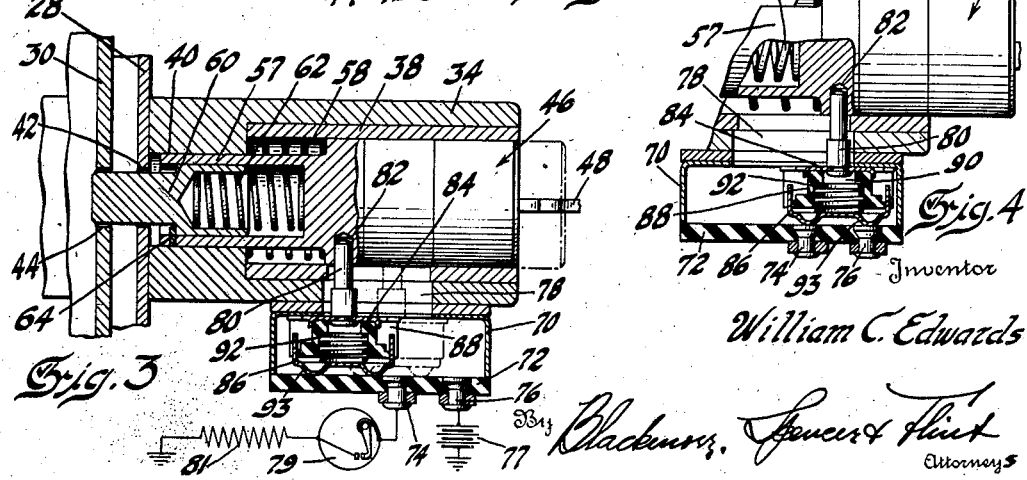
Inventor
William C. Edwards
By Blackmore, Spencer & Flint
Attorneys Feb. 28, 1939.　　W. C. EDWARDS　　2,148,609
STEERING COLUMN LOCK
Filed May 31, 1935　　2 Sheets-Sheet 2
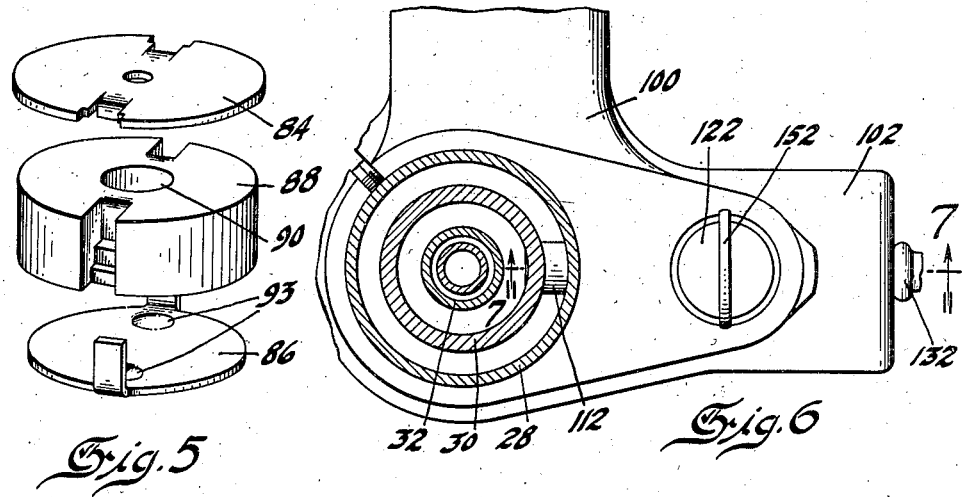
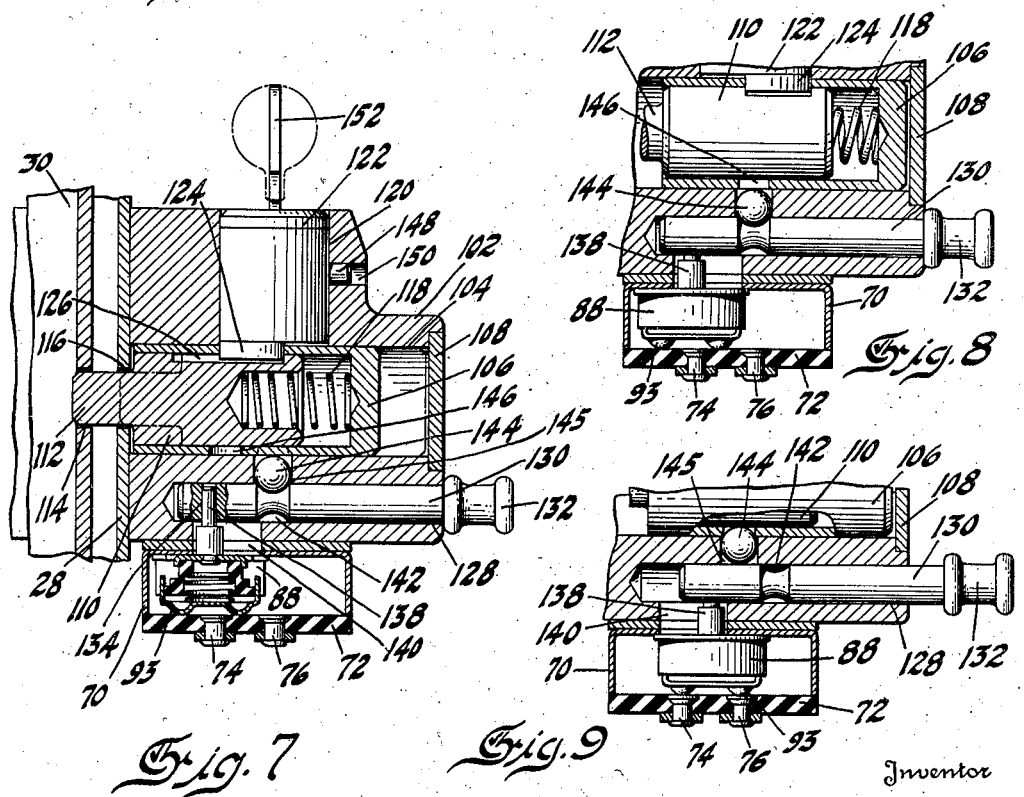
Inventor
William C. Edwards
By Blackmore, Spencer & Flint
Attorneys Patented Feb. 28, 1939

2,148,609

UNITED STATES PATENT OFFICE 2,148,609

STEERING COLUMN LOCK

William C. Edwards, Anderson, Ind., assignor to General Motors Corporation, Detroit, Mich., a corporation of Delaware Application May 31, 1935, Serial No. 24,246

1 Claim. (Cl. 70—252)

This invention relates to automotive vehicle locks and more particularly to locks having a dual function of locking both the steering column against rotation and the ignition circuit in open condition with a single locking means.

It is an object of my invention to provide a simple, economical lock with the above dual functions.

It is a further object to provide a certain sequence of operation of the parts for purposes of safety.

For a better understanding of the nature and objects of this invention, reference is made to the following specification wherein there are described the embodiments of my invention which are illustrated in the accompanying drawings, in which, Fig. 1 is a side elevation of a steering post and wheel with my lock in position.

Fig. 2 is a sectional view taken on the line 2—2 of Fig. 1.

Fig. 3 is a sectional view taken on the line 3—3 of Fig. 2 showing the electrical connections.

Fig. 4 is a sectional view similar to Fig. 3 showing the plunger lock and contacts in the circuit closing position.

Fig. 5 is a perspective view showing the parts of the switch in spaced relation.

Fig. 6 is a section through a steering column showing a modified form of my invention.

Fig. 7 is a sectional view taken on the line 7—7 of Fig. 6.

Fig. 8 is a sectional view similar to Fig. 7 showing the plunger in unlocked position but the ignition switch still open.

Fig. 9 is a sectional view similar to Fig. 8 showing the plunger in unlocked position and the switch closed.

A steering wheel 2 is rotatably supported on the upper end of a steering column, generally designated at 4, surrounding which is an angular casting 6 having one leg 8 projecting forwardly and upwardly therefrom and having at its outer end a series of serrations or teeth 10 which are adapted to engage and internest with a similar series of serrations 12 on the angled end of a bracket 14 rigidly secured to an instrument panel 16. A bolt 18 projects through both the angled end of the lever 14 and the member 8 and secures the two together with the serrations mating.

The casting 6 has a slot 22 cut in one face from the outside to the opening 20 through which the steering post 4 projects. A bore 24 is cut into the casting at right angles to the slot 22 and has its most extreme portion threaded to receive the end of a bolt 26, the head of which exerts a force tending to close the slot 22 and clamping the casting on the steering post 4.

The steering post is composed of a series of concentric tubes, the outer 28 of which is the outer casing which surrounds the next smaller size 30 which is the actuating or steering tube and which carries within it a series of tubes 32 which may be used as conductors for various control apparatus such as the electric conduit for the horn, lights, etc.

At approximately right angles to the leg 8 of the casting is a second angular leg 34 which has a cylindrical bore 36 cut into it at right angles to the steering post 4. Within this bore is nested a cylindrical sleeve 38 whose function will later be apparent. From the lower end of the bore 36 and concentric therewith is cut a smaller bore 40 which extends to the outer cylindrical casing 28 of the steering post. In line with both of these bores are cut two cylindrical holes 42 and 44 in the tubings 28 and 30, respectively. Fitting within this series of bores is a conventional cylindrical lock assembly 46 which may be operated by key 48. The barrel of the lock 46 has a retractible pin 50 projecting therethrough which engages with a series of openings 52, 54 and 56 in the cylindrical sleeve 38 and it may be placed at either of these openings by an operation of the key. The inner end of the barrel 57 is made of smaller diameter and is adapted to fit within the bore 40 and may move longitudinally therein. Surrounding this portion, and acting between the rear face of the larger barrel and the inner end of the bore 36, is a spring 58 whose action tends to press the lock from the opening. This portion 57 of the barrel is hollow and a plunger 60 is reciprocable therein, a spring 62 being held within the hollow inner end of the plunger 60 and against the base of the hollow opening 57 to cause the plunger to project into the steering column. A stop 64 is placed adjacent the forward end of the portion 57 to prevent the plunger 60 from being entirely expelled from the hollow portion 57. In the sleeve 38, opposite the retractible pin 50, is a long slot 66 in which a lug 68 from the side of the large barrel is adapted to slide. The action of this lug 68 against the ends of the slot limit the motion of the lock therein. To the lower portion of the outer end of the leg 34 is secured an angular housing 70, the base of which is formed of a piece of insulating material 72 and carries therein two contacts 74 and 76. This switch housing is secured to the casing by any desired means such as welding. A series of aligned openings, which are comparatively long and narrow and shown generally at 78, are cut through the top of the housing 70 and the leg 34 and sleeve 38 to allow a pin 80 to project therethrough and have linear movement. The pin projects into a circular hole 82 in the lock barrel and carries at its lower end a circular disc 84 by being riveted thereto. A second circular disc 86 is positioned directly below disc 84 and between the two is an insulated circular block 88 having therein two diametrically opposite notches in its periphery which engage inturned lips on both the circular discs to prevent rotation of the discs and to secure the assembly together. The center of the insulating block 88 is cut out to form an opening 90 and in this opening is positioned a coil spring 92 whose action it is to press the two discs apart. The lower disc also has two pressed out knobs 93 which act as contact points and engage the two contacts 74 and 76 when in the proper position.

It is thus seen that when the assembly is placed together within the housing 70, the spring 92 will tend to press the lower circular disc 86 down against the insulating surface 72 and when the assembly is slid over so that the knobs 93 are over the two contact points, a good contact will be insured.

A conventional ignition system is shown wherein contact 76 is connected to one side of the battery 77 and then to ground and the other terminal 74 is connected to circuit breaker 79 and then through a primary coil 81 to ground. In this way, when the contacts 76 and 74 are short circuited, the ignition system will be readily operable.

In the operation of this form of my device, it will be seen that when the retractible pin 50 is in the opening 52, the plunger 60 will be pressed by the spring 62 against the stop 64 and will project into the opening 44 in the actuating tube 30 and prevent the steering wheel from turning. In this position also the main barrel will be in such position that it will hold the switch contact assembly to the extreme left position, as shown in Fig. 3, and the ignition circuit will therefore be open. The key may then be turned to retract the pin 50 and allow the barrel to be moved out until the pin engages the opening 54 at which point the plunger 60 will be retracted from the opening 44, as shown in dotted line position, Fig. 2, so that the steering column is now able to turn. At the same time the switch assembly will have been moved out the same distance and will be in the position as shown in dotted lines, Fig. 3. The right-hand knob 93 will have passed over the contact 74 but still the lower plate has not bridged the contacts to complete the circuit. Therefore, at this point we have the steering wheel unlocked but the ignition circuit still open. If now the key 48 is turned to retract the pin 50 again so that it may engage in the opening 56, this additional motion will not affect the plunger 60, except to further retract the same, but will complete the bridging action of the switch assembly so that both knobs 93 will now engage the contacts 74 and 76 to complete the ignition circuit, as shown in Fig. 4, so that the car may be started. There are, therefore, three positions, that of both steering wheel and ignition locked, a second with the steering wheel unlocked and ignition locked, and the third, steering wheel unlocked and ignition unlocked. It should be noted that this sequence insures safety of operation in that the steering wheel is unlocked first so that the car may be steered before the motor may be started. Also with any locking action the ignition is shut off first so that there is no danger of leaving it on and discharging the battery or of locking any mechanical parts before the motor is shut off.

In a modified form of my invention, disclosed in Figs. 6–9 inclusive, a similar casting 100 is secured to the steering column in the same manner previously shown. The extended leg 102 has a bore 104 cut therein at right angles to the steering post in which is adapted to slide a hollow plunger 106. A plate 108 is secured across the outer end of the opening to prevent the plunger 106 from protruding therefrom. Within the hollow plunger 106 is slidably supported a second plunger 110 whose inner portion is of smaller diameter to provide a projecting nose 112 which passes through openings 114 and 116 in the actuating tube and outer casing, respectively, of the steering column. A spring 118 rests against the base of the hollow plunger 106 and also against the opposite base of the plunger 110 and tends to keep the two in spaced relation. A second bore 120 above the bore 104, and at right angles thereto, has positioned therein a cylindrical barrel lock 122 which has an eccentric projecting pin 124 on the lower face. This pin 124 projects through the upper wall of the hollow plunger 106 and engages a slot 126 in the upper face of the plunger 110. The lock barrel 122 has projecting from its periphery, a small retractible pin 148 which engages an opening 150 in the casting to lock the same and which may be retracted by turning the key.

The lower portion of the casting has a smaller bore 128 parallel to the bore 104 which carries a rod 130 therein and an operating knob 132 on the outer end. Adjacent the inner end is a diametrical hole 134 therethrough in which engages a pin 138 of a switch actuating mechanism similar to that disclosed in the previous modification which may be reciprocated back and forth in the elongated slot 140 which is similar to slot 78 in the previous showing. Between opening 134 and the outer end of the rod 130 is a circular groove 142 in the outer periphery which engages with a small ball bearing 144 supported in an opening 145 in the casting between bore 104 and 128 which acts as a locking member for the same. In the lower periphery of the plunger 106 is an opening 146 which when in alignment with the small ball bearing will allow the same to go upwardly a sufficient amount to allow actuation of the rod and its attached switch assembly.

In this modification the operation is as follows: As shown in Fig. 7, when the tongue 112 is in place in the opening 114 to lock the steering column against rotation, and the ball bearing is seated in the groove 142 to lock the switch assembly, the key 152 will then be turned which first pulls the retractible pin 148 out of engagement with the opening 150 and upon further rotation the eccentric pin will pull the plunger 110 and the hollow plunger 106 to the right until it reaches the position as shown in Fig. 8, where the tongue 112 will be retracted from the opening 114 and unlock the steering column. This places the opening 146 directly above the ball 144 and upon pulling upon the knob 132 the ball will be forced up into the opening 146 and the switch member placed in such position that the knobs 93 will bridge the contacts 76 and 74 to complete the ignition circuit, as have best been shown in Fig. 9.

In this modification of course it is necessary to move two separate means rather than to move one means to two positions, but the same sequence is followed as previously so that it fulfills the same factors of safety of operation as before.

From the foregoing it is evident that I have provided a simple and economical locking means for locking two portions of the car, that is, the steering column and ignition circuit with a device which may be easily applied and of such size that it is not particularly noticeable.

While I have shown and disclosed two definite mechanical means for carrying out my invention, it is apparent that there may be other ways of accomplishing the same result and therefore I do not wish my invention to be limited to the device as disclosed, but only by the appended claim.

I claim:

In a unitary lock structure, a body having a cylindrical bore of two different diameters, a slidable plunger having portions of two different diameters, the smaller of which slidably engages the smaller portion of the cylindrical bore and has a longitudinally extending opening therein, a locking bolt carried by the plunger and having a portion within the opening, said last mentioned portion having a spring receiving opening therein, a first stop on said plunger, a coil spring within said openings forcing a portion of said locking bolt against said first stop, a coil spring surrounding said smaller portion of the plunger having one end thereof contacting the larger portion of the plunger and tending to force the plunger from the bore, a second stop preventing movement of said plunger from said bore, spaced switch contacts secured to the body and electrically insulated therefrom, a pin secured to the larger portion of the plunger, means carried by said pin adapted to bridge the switch contacts to complete an electrical circuit therethrough when the plunger is in its outermost position, a locking pin projecting from the larger portion of the plunger, three spaced indexing notches for the locking pin and means to move the plunger and locking pin to the positions determined by the indexing notches, said locking bolt being in locked position when the locking pin is in engagement with the inner indexing notch and in unlocked position when the locking pin engages either of the other indexing notches.

WILLIAM C. EDWARDS.